United States Patent [19]

Inubushi

[11] Patent Number: 5,370,201

[45] Date of Patent: Dec. 6, 1994

[54] ANTI-THEFT DEVICES FOR MOTOR VEHICLES

[76] Inventor: Hajime Inubushi, 2112, 1-2, Takasu-cho 1-chome, Nishinomiya-shi, Hyogo-ken 663, Japan

[21] Appl. No.: 114,987

[22] Filed: Sep. 2, 1993

[51] Int. Cl.⁵ .................................. B60R 25/00
[52] U.S. Cl. .................................... 180/287
[58] Field of Search ......................... 180/287

[56] References Cited
U.S. PATENT DOCUMENTS 4,691,801 9/1987 Mann et al. ................. 180/287
4,884,055 11/1989 Memmola ................... 180/287

OTHER PUBLICATIONS

Radio Shack 1993 Catalog, p. 85, Copyright 1992.

*Primary Examiner*—Kenneth R. Rice
*Attorney, Agent, or Firm*—Carroll F. Palmer

[57] ABSTRACT

An anti-theft device for a motor vehicle includes in combination an electromagnetic wave receiver, e.g. a cellular telephone, a disabling unit which when energized by the receiver will cause the vehicle's engine to stop running and a portable electromagnetic wave transmitter, e.g., a cellular telephone, capable of emitting a signal receptive by the receiver to effect energizing of the disabling unit. In one embodiment, the disabling unit opens the electrical motor control system to stop the engine. In another embodiment, the disabling unit stops flow of fuel to the engine thereby stopping it.

4 Claims, 1 Drawing Sheet

ANTI-THEFT DEVICES FOR MOTOR VEHICLES

BACKGROUND OF THE INVENTION

1. Field of the Invention

This application relates to anti-theft devices for motor vehicles.

2. Description of the Prior Art

One big current social problem is theft of automobiles or other motor vehicles. This statistically is most likely to happen during a relatively short period of time while the driver leaves his or her car unlocked, say, for picking up passengers or luggage. Some car thiefs are skilled enough to steal a car by unlocking a door and manipulating its electric starting circuit even if the owner has left the car locked.

Of more recent occurrence, are the so-called carjackings in which the thief takes a car at the point of a gun or other weapon leaving the owner to just stand by while the car is driven away. In either case, when the vehicle is stolen, it is carried out of the owners reach.

Even money transport vehicles that have independent driver's compartment and a separate safe compartment in which a guard rides an not exempt from theft. There have been incidents where such vehicles have been stolen by expelling the driver(s) from the driver's compartment, while the guard is left in the safe compartment unaware that the vehicle has been hijacked.

OBJECTS

A principal object of the invention is the provision of new anti-theft devices for motor vehicles.

A further object is the provision of such devices that can disable the running of a stolen motor vehicle thereby effectively terminating the theft.

Another object is the provision of such devices that permit money transport vehicles which include a separate guard security compartment to be stopped from a remote location and at the same time notify a guard who may be aboard a stolen transport vehicle of such condition effecting the guard's safety.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of an anti-theft device for a motor vehicle that comprises in combination an electromagnetic wave receiver, disabling means which when energized will cause the vehicle engine to stop its operation, conductor means operatively connecting the receiver to the disabling means, and a portable electromagnetic wave transmitter capable of emitting a signal receptive by the receiver to effect energizing of tile disabling means.

In a first embodiment of the new anti-theft device, the disabling means which when energized will cause the electric circuit that controls running of the engine to open thereby stopping running of the engine and operation of the vehicle.

In a second embodiment of the new anti-theft device for a motor vehicle, e.g., a vehicle with a diesel engine, the disabling means is a solenoid valve positioned in the fuel line that when energized will stop flow of fuel through the fuel line thereby stopping running of the engine and operation of the vehicle.

Advantageously, the transmitter and the receiver of the new anti-theft device can be cellular telephones. In such wireless communication use may be made of a cellular telephone network where the transmitter dials the receiver.

Using the new devices of the invention, when the owner sends the stop signal to the device receiver, the stolen car under theft can not be driven any more, providing the legitimate owner ample time to search for his or her stolen car and makes the car theft incomplete and unsuccessful. After the engine has stopped in this way by the owner, the thief is prevented from restarting the engine.

The receiver loaded in the car has to be prevented from erroneous operation for actuation of the disabling means in response to noise signals, when the car is actually stolen or is driven by a legitimate owner. According to a preferred aspect of the invention, the transmitter unit comprises a modulation generator capable of transmitting modulated signals so that only when the receiver loaded in a car receives tile correct modulated signals, a relay switch provided in the receiver is thereby actuated.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
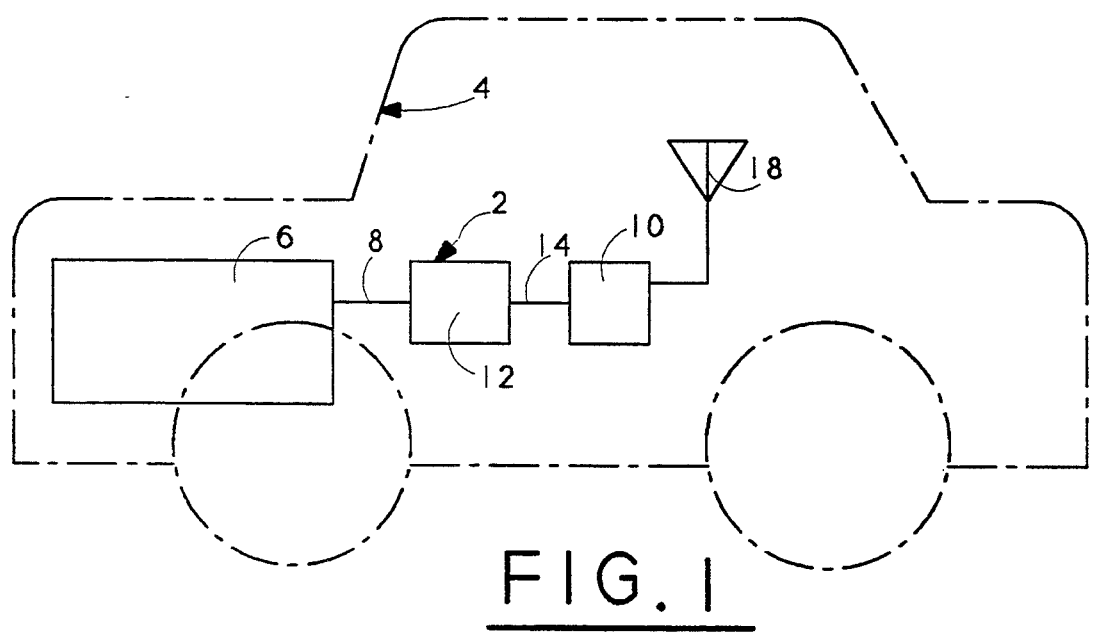
FIG. 1 is a schematic view of a motor vehicle equipped with a first embodiment of an anti-theft device of the invention.
Figure 2:
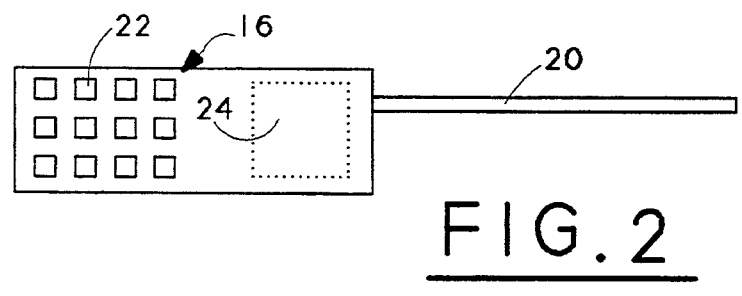
FIG. 2 is a plan view of a transmitter component of the new anti-theft device of the invention.

Referring in detail to the drawings, a first embodiment of an anti-theft device 2 of the invention for a motor vehicle 4 that includes an engine 6 and an electric circuit 8 that controls operation of the engine 6 comprises in combination (a) an electromagnetic wave receiver 10, preferably a cellular phone (b) disabling means 12 which when energized will cause the electric circuit 8 to open thereby stopping operation of the engine 6, (c) conductor means 14 operatively connecting receiver 10 to the disabling means 12, and (d) a portable electromagnetic wave transmitter 16 preferably a cellular phone capable of emitting a signal receptive by the receiver 10 to effect energizing of the disabling means 12.

Typically, means 12 will be a normally closed solenoid relay switch that when energized opens to stop flow of current through electric circuit 8.

The receiver 10 includes an antenna 18 while the transmitter has an antenna 20, keypad 22 and a modulation generator 24 for transmitting a modulated signal so that the receiver 10 may energize the disabling means 12 only in response to reception of such modulated signal.

Figure 3:
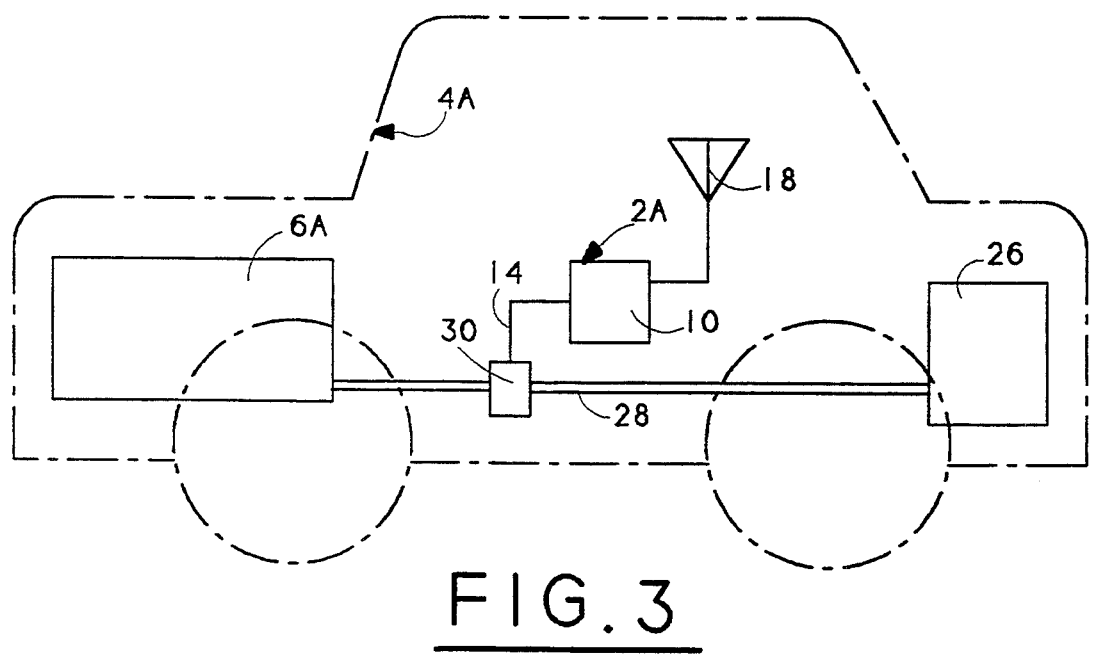
FIG. 3 is a schematic view of a motor vehicle equipped with a second embodiment of an anti-theft device of the invention.

In a second embodiment shown in FIG. 3, the anti-theft device 2A for motor vehicle 4A that includes a diesel engine 6A, a fuel tank 26 and a fuel line 28 that conveys fuel from tank 26 to engine 6A comprises in combination electromagnetic wave receiver 10 and solenoid valve 30 positioned in fuel line 28 that when energized will stop flow of fuel through fuel line 28 thereby stopping operation of engine 6A.

The device 2A further includes conductor means 14 to operatively connect receiver 10 to solenoid valve 30 and a portable electromagnetic wave transmitter 16 capable of emitting a signal receptive by receiver 10 to effect energizing of solenoid valve 30.

In either embodiment, when a legitimate driver leaves his or her car, he or she carries the transmitter unit 16. Suppose that such owner becomes aware the car has been stolen, e.g., by returning to the parking location. The owner then turns on the transmitter unit 16 to transmit a signal. The signal transmitted is then received by the receiver 10 loaded on the stolen car, thereby actuating the disabling means in the car so its engine is stopped. The car is thus prevented from being driven further, thereby providing the legitimate driver ample time to search for and locate the stolen car.

I claim:

1. An anti-theft device for a motor vehicle that includes an engine and an electric circuit that controls operation of said engine which comprises in combination:
   a first cellular phone,
   disabling means which when energized will cause said electric circuit to open thereby stopping operation of said engine,
   conductor means operatively connecting said first cellular phone to said disabling means to cause energization thereof, and
   a second cellular phone comprising a modulation generator for transmitting a modulated signal receptive by said first cellular phone whereby said first cellular phone only upon receiving said modulated signal may energize said disabling means thereby stopping operation of said engine.

2. A motor vehicle that includes an engine, a fuel tank and a fuel line that conveys fuel from said tank to said engine,
   a first cellular phone carried by said motor vehicle,
   a solenoid valve positioned in said fuel line that when energized will stop flow of fuel through said fuel line thereby stopping operation of said engine,
   a second cellular phone separate from said motor vehicle capable of emitting a signal receptive by said first cellular phone and
   conductor means operatively connecting said first cellular phone to said solenoid valve to effect energizing thereof to stop flow of said fuel through said fuel line.

3. The device of claim 2 wherein said engine is a diesel engine.

4. A money transport motor vehicle capable of carrying a security guard aboard which comprises in combination:
   an engine,
   an electric circuit that controls operation of said engine,
   disabling means which when energized will cause said electric circuit to function to stop operation of said engine and to notify said security guard,
   a first cellular phone carried aboard said money transport motor vehicle,
   conductor means operatively connecting said first cellular phone to said disabling means to cause energization thereof, and
   a second cellular phone comprising a modulation generator for transmitting a modulated signal receptive by said first cellular phone whereby said first cellular phone only upon receiving said modulated signal may energize said disabling means.

* * * * *